United States Patent
Chandler et al.

(10) Patent No.: US 10,239,050 B2
(45) Date of Patent: Mar. 26, 2019

(54) SCR CATALYSTS HAVING IMPROVED LOW TEMPERATURE PERFORMANCE, AND METHODS OF MAKING AND USING THE SAME

(71) Applicant: JOHNSON MATTHEY PUBLIC LIMITED COMPANY, London (GB)

(72) Inventors: Guy Richard Chandler, Cambridge (GB); Jillian Elaine Collier, Reading (GB); Alexander Nicholas Michael Green, Baldock (GB); Desiree Duran-Martin, Reading (GB); Paul Richard Phillips, Royston (GB); Raj Rao Rajaram, Berkshire (GB); Stuart David Reid, Cambourne (GB)

(73) Assignee: Johnson Matthey Public Limited Company, London (GB)

( * ) Notice: Subject to any disclaimer, the term of this patent is extended or adjusted under 35 U.S.C. 154(b) by 492 days.

(21) Appl. No.: 14/633,777

(22) Filed: Feb. 27, 2015

(65) Prior Publication Data
US 2015/0246346 A1 Sep. 3, 2015

Related U.S. Application Data

(60) Provisional application No. 61/946,065, filed on Feb. 28, 2014.

(51) Int. Cl.
| | |
|---|---|
| *B01J 29/06* | (2006.01) |
| *B01J 29/072* | (2006.01) |
| *B01J 37/14* | (2006.01) |
| *B01J 37/18* | (2006.01) |
| *B01J 37/12* | (2006.01) |
| *B01J 37/16* | (2006.01) |
| *B01D 53/56* | (2006.01) |
| *B01J 37/00* | (2006.01) |
| *B01J 29/46* | (2006.01) |
| *B01J 29/68* | (2006.01) |
| *B01J 29/85* | (2006.01) |
| *C01B 39/02* | (2006.01) |
| *C01B 39/44* | (2006.01) |
| *C01B 39/54* | (2006.01) |
| *B01D 53/94* | (2006.01) |
| *B01J 29/76* | (2006.01) |

(52) U.S. Cl.
CPC ............ *B01J 29/072* (2013.01); *B01D 53/56* (2013.01); *B01D 53/565* (2013.01); *B01D 53/9418* (2013.01); *B01J 29/46* (2013.01); *B01J 29/68* (2013.01); *B01J 29/76* (2013.01); *B01J 29/763* (2013.01); *B01J 29/7615* (2013.01); *B01J 29/85* (2013.01); *B01J 37/0036* (2013.01); *B01J 37/12* (2013.01); *B01J 37/14* (2013.01); *B01J 37/16* (2013.01); *B01J 37/18* (2013.01); *C01B 39/02* (2013.01); *C01B 39/44* (2013.01); *C01B 39/54* (2013.01); *B01D 2251/2062* (2013.01); *B01D 2251/2067* (2013.01); *B01D 2255/20738* (2013.01); *B01D 2255/50* (2013.01); *B01D 2255/502* (2013.01); *B01D 2255/504* (2013.01); *B01D 2258/012* (2013.01); *B01D 2258/0283* (2013.01); *B01J 37/0045* (2013.01); *B01J 2229/10* (2013.01); *B01J 2229/186* (2013.01); *B01J 2229/36* (2013.01); *B01J 2229/40* (2013.01)

(58) Field of Classification Search
CPC . B01J 29/072; B01J 29/46; B01J 29/68; B01J 29/76; B01J 29/7615; B01J 29/763; B01J 29/85; B01J 2229/10; B01J 2229/36; B01J 2229/40; B01J 37/00; B01J 37/12; B01J 37/14; B01J 37/16; B01J 37/18; B01J 37/0036; B01J 37/0045; B01D 53/9418; B01D 53/56; B01D 53/565; B01D 2255/50; B01D 2255/502; B01D 2255/504; B01D 2258/0128; B01D 2258/012
USPC .................................. 502/60, 74, 75, 77, 85
See application file for complete search history.

(56) References Cited

U.S. PATENT DOCUMENTS

| 4,255,349 A | 3/1981 | Butter et al. | |
|---|---|---|---|
| 4,961,917 A * | 10/1990 | Byrne ................ | B01D 53/9418 423/239.2 |
| 5,520,895 A * | 5/1996 | Sharma .............. | B01D 53/8621 423/239.1 |

(Continued)

FOREIGN PATENT DOCUMENTS

| WO | 2011/026573 A1 | 3/2011 |
|---|---|---|
| WO | 2014/125305 A1 | 8/2014 |

OTHER PUBLICATIONS

Kaucky et al.; Effect of FeH-zeolite structure and Al-Lewis sites on N2O decomposition and NO/NO2-assisted reaction; Journal of Catalysis 238 (2006); pp. 293-300; Elsevier Inc.

(Continued)

*Primary Examiner* — Elizabeth D Wood

(57) ABSTRACT

SCR-active molecular-sieve based catalysts with improved low-temperature performance are made by heating a molecular-sieve in a non-oxidizing atmosphere with steam (hydrothermal treatment), or in a reducing atmosphere without steam (thermal treatment), at a temperature in the range of 600-900° C. for a time period from 5 minutes to two hours. The resulting SCR-active iron-containing molecular sieves exhibit a selective catalytic reduction of nitrogen oxides with $NH_3$ or urea at 250° C. that is at least 50% greater than if the iron-containing molecular-sieve were calcined at 500° C. for two hours without performing the hydrothermal or thermal treatment.

13 Claims, 3 Drawing Sheets

(56) References Cited

U.S. PATENT DOCUMENTS

| | | | |
|---|---|---|---|
| 5,552,129 A * | 9/1996 | Farnos | B01D 53/8621 423/239.2 |
| 9,539,564 B2 * | 1/2017 | Ibe | B01J 37/18 |
| 9,550,182 B2 | 1/2017 | Munch et al. | |
| 2012/0208692 A1 * | 8/2012 | Munch | B01D 53/9418 502/74 |

OTHER PUBLICATIONS

Perez-Ramirez; Active iron sites associated with the reaction mechanism of N20 conversions over steam-activated FeMFI zeolites; Journal of Catalysis 227 (2004), pp. 512-522; Elsevier Inc.

Dubkov et al.; Evolution of Iron States and Formation of α-Sites upon Activation of FeZSM-5 Zeolites; Journal of Catalysis 207 (2002), pp. 341-352; Elsevier Science.

\* cited by examiner

SCR CATALYSTS HAVING IMPROVED LOW TEMPERATURE PERFORMANCE, AND METHODS OF MAKING AND USING THE SAME

CROSS-REFERENCE TO RELATED APPLICATIONS

This application claims priority to U.S. Provisional Application No. 61/946,065, filed on Feb. 28, 2014, and is incorporated herein by reference.

BACKGROUND OF THE INVENTION

Field of the Invention

The invention relates generally to molecular sieve based-catalysts used in selectively converting nitrogen oxides ($NO_x$) present in a gas stream to nitrogen using a nitrogenous reductant such as ammonia ($NH_3$) and in particular it relates to Fe-containing catalysts which are particularly active at relatively low temperatures in relation to conventional Fe zeolite catalysts. The molecular sieve in these catalysts is preferably a zeolite or a silicoaluminophosphate (SAPO).

Description of Related Art

Selective catalytic reduction (SCR) systems utilize $NH_3$ as a reductant to reduce $NO_x$ to elemental nitrogen. A principal application of SCR technology is in the treatment of $NO_x$ emissions from internal combustion engines of motor vehicles, and especially lean-burn internal combustion engines. SCR systems are also applied to static sources of $NO_x$, such as power plants.

One class of SCR catalysts is transition metal exchanged zeolites. Vanadium-based SCR catalysts are unsuited for higher temperature environments due to their thermal instability. This has led to the developments of copper and iron promoted zeolites. Copper zeolite catalysts achieve high $NO_x$ conversion (90% or more) at relatively low temperatures (from about 180 to about 250° C.), but they require the injection of greater amounts of urea to be effective at relatively higher temperatures (greater than about 450° C.). Conventional iron zeolite catalysts achieve high conversion (90% or more) of $NO_x$ at temperatures over 350° C., but at lower temperatures more typical for example of normal diesel engine exhaust (about 180 to about 250° C.), high conversions (up to about 90%) are obtained only in the presence of high levels of $NO_2$ (50% of the total NOx levels, i.e. 1:1 $NO_2$:NO).

It would therefore be desirable to provide SCR catalysts having improved low temperature (from about 200 to about 300° C.) performance.

SUMMARY OF THE INVENTION

The present invention reflects the inventors' surprising discovery that treating an iron-containing molecular sieve at a relatively high temperature (about 600° C. to about 900° C.) for a period of time from about 5 minutes to about two hours, in a non-oxidizing atmosphere and in the presence of steam (hydrothermal treatment), improves the dispersion of the iron to the ion-exchange sites of the molecular sieve, and thereby improves the low-temperature (from about 150° C. to about 300° C.) performance of the iron-containing molecular sieve. This effect is particularly advantageous in connection with zeolites or SAPOs of medium and smaller pore size, such as ferrierite, in which the dispersion of iron to the ion-exchange sites is otherwise hindered to a greater extent than for larger pore zeolites.

The inventors have also discovered that treating an iron-containing molecular sieve, preferably a zeolite or a SAPO, at a relatively high temperature (about 600° C. to about 900° C.) for a period of time from about 5 minutes to about two hours, in a reducing atmosphere without the presence of steam (thermal treatment) also improves the dispersion of the iron to the ion-exchange sites of molecular sieve, preferably a zeolite or a SAPO, and thereby improves the low-temperature (from about 150° C. to about 300° C.) performance of the iron-containing molecular sieve.

Thus, in one aspect, the invention relates to a method of making an SCR-active molecular sieve based-catalyst, preferably a zeolite or a SAPO, comprising performing a hydrothermal treatment on an iron-containing molecular sieve, preferably a zeolite or a SAPO, in a non-oxidizing atmosphere at a temperature in the range of about 600° C. to about 900° C. for a time period from about 5 minutes to about two hours.

In another aspect, the invention relates to a method of making an SCR-active molecular sieve, preferably a zeolite or a SAPO, comprising performing a thermal treatment on an iron-containing molecular sieve, preferably a zeolite or a SAPO, in a reducing atmosphere at a temperature in the range of about 600° C. to about 900° C. for a time period from about 5 minutes to about two hours.

As used herein, the term "hydrothermal treatment" means heating the material to high temperatures (about 600° C. to about 900° C.) in a non-oxidizing, i.e. inert or reducing, atmosphere, in the presence of steam.

As used herein, the term "thermal treatment" means heating the material to high temperatures (about 600° C. to about 900° C.) in a reducing atmosphere without the presence of steam.

As used herein, the term "calcine", or "calcination", means heating the material in air or oxygen. This definition is consistent with the IUPAC definition of calcination. (IUPAC, Compendium of Chemical Terminology, 2nd ed. (t)e "Gold Book"). Compiled by A. D. McNaught and A. Wilkinson, Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8, doi:10.1351/goldbook.) Calcination is performed to decompose the metal salt and promote the exchange of metal ions with the molecular sieve and also to adhere the catalyst to a substrate. The temperatures used in calcination depend upon the components in the material to be calcined and generally are between about 400° C. to about 900° C. In applications involving the molecular sieves in the processes described herein, calcinations are generally performed at temperatures from about 450° C. to about 500° C.

Unless specified otherwise, the term "low temperature", when used in describing the performance of the catalyst, means a temperature from about 150° C. to about 300° C.

Unless specified otherwise, the term "high temperature", when used in describing the performance of the catalyst, means about 450° C. to about 600° C. The term "high temperature", when used in describing the hydrothermal treatment of the catalyst, means about 600° C. to about 900° C.

As used herein, the term "about" means approximately. Approximating language, as used throughout the specification and claims, may be applied to modify any quantitative representation that could permissibly vary without resulting in a change in the basic function to which it is related. Accordingly, a value modified by a term such as "about" is not to be limited to the precise value specified. With regard to the use of the term "about" and specific numerical values encompassed by the term, the number of significant figures, the precision of the value and the context in which the term is used are important in determining the numerical values associated with the term. For example, if a series of measurements are taken over a temperature range from 300° C. to 500° C., where the measurements are made at 25° C. intervals, the term "about 400° C." would encompass the range from 387° C. to 412° C., inclusive. When "about" is used in describing units of time in hours, the stated value includes a range of plus or minus 15 minutes, inclusive. For example, "about 2 hours" is meant to include time from 1 hour 45 minutes to 2 hours 15 minutes, inclusive. When "about" is used in describing units of time in minutes, the stated value includes a range of plus or minus 8 minutes, inclusive. For example, "about 30 minutes" is meant to include time from 22 minutes to 38 minutes, inclusive.

DETAILED DESCRIPTION OF THE INVENTION

It has been found that hydrothermal or thermal activation of molecular sieves, especially small pore/medium pore iron-containing molecular sieves, especially zeolites and silicoaluminophosphates (SAPOs) results in a material suitable for iron-based selective catalytic reduction that can achieve greater than 90% NOx conversion efficiency at 200° C. in 75% $NO_2$/NOx with fast transient response to $NH_3$ fill. A transient response is defined as the rate of increase in NOx conversion as the catalyst fills with $NH_3$ from zero ammonia exposure to saturated ammonia exposure.

Without wishing to be held to any particular theory, the effect is attributed to the redispersion of iron to the exchange sites and creation of new more active sites via Fe-molecular sieve, preferably Fe-zeolite or Fe-SAPO interactions induced by the high temperature treatment.

The improved iron-containing molecular sieves, preferably a zeolite or a SAPO, described herein thus provide increased NOx conversion without the requirement for large amounts of $NH_3$ prefill in high $NO_2$/NOx (75%) environments. In contrast, iron zeolites prepared by calcining for five hours at 750° C. in air require large amounts of $NH_3$ to be dosed and stored on the catalyst to achieve a fill level of 0.8 g/L to reach acceptable conversion levels at 200° C.

Non-limiting examples of the types of exhaust gases that may be treated with the disclosed iron-containing molecular sieves include automotive exhaust, including from diesel engines. The disclosed iron-containing molecular sieves are also suitable for treating exhaust from stationary sources, such as power plants, stationary diesel engines, and coal-fired plants.

The iron-containing molecular sieves, preferably a zeolite or a SAPO, of the invention may be provided in the form of a fine powder which is admixed with or coated by a suitable refractory binder, such as alumina, bentonite, silica, or silica-alumina, and formed into a slurry which is deposited upon a suitable refractory substrate. The carrier substrate may have a "honeycomb" structure. Such carriers are well known in the art as having a many fine, parallel gas flow passages extending therethrough.

The iron-containing molecular sieve, preferably a zeolite or a SAPO, may undergo hydrothermal or thermal treatment in either powder form or as an admixture with other components in a form such as a coating, an extrudate, etc.

Hydrothermal or thermal treatment is performed on an iron-containing molecular sieve, preferably a zeolite or a SAPO, at a temperature in the range of about 600° C. to about 900° C. for a time period from about 5 minutes to about two hours.

When the zeolite is a ZSM-5, the hydrothermal or thermal treatment is performed at a temperature in the range of from about 600° C. to about 800° C., more preferably from about 670° C. to about 730° C., even more preferably from about 670° C. to about 730° C., and yet even more preferably about 700° C., for a time period from about 5 minutes to about two hours.

When the zeolite is ferrierite, the hydrothermal or thermal treatment is performed at a temperature in the range of from about 700° C. to about 900° C., more preferably from about 750° C. to about 850° C., even more preferably from about 770° C. to about 830° C., and yet even more preferably about 800° C., for a time period from about 5 minutes to about 2 hours.

Preferably, small pore and medium pore molecular sieves, including zeolites and SAPOs can be used. One of ordinary skill in the art would be able to determine the combinations of temperatures and times that these molecular sieves would need to undergo hydrothermal or thermal treatment for commercial and/or optimal performance.

The non-oxidizing atmosphere is an inert or reducing atmosphere. Preferably the inert atmosphere comprises nitrogen. Preferably the reducing atmosphere comprises hydrogen. When the treatment is hydrothermal, steam is also present. When the treatment is thermal, steam is not present.

The method can further comprise introducing oxygen into the non-oxidizing atmosphere after the hydrothermal or thermal treatment during a stage where the temperature decreases from the temperature of the hydrothermal treatment to ambient temperature (about 25° C.).

The hydrothermal or thermal treatment can be performed in a rotary calcination oven in which an iron-containing molecular sieve, preferably a zeolite or a SAPO, is exposed, preferably in a powder form, to a countercurrent flow of gas constituting the non-oxidizing or reducing atmosphere.

The iron-containing molecular sieve, preferably a zeolite or a SAPO, subjected to the hydrothermal or thermal treatment can be in the form of an extruded unsupported catalyst or a coating on an inert substrate.

The iron-containing molecular sieve, preferably a zeolite or a SAPO, is prepared by mixing a molecular sieve with an iron salt. The mixing can comprise impregnating a molecular sieve, preferably a zeolite or a SAPO, with a solution of an iron salt; liquid phase ion-exchange of a slurry of a molecular sieve, preferably a zeolite or a SAPO, with a solution of an iron salt spray-drying a slurry of a molecular sieve, preferably a zeolite or a SAPO, and a solution of an iron salt; or by combining a molecular sieve, preferably a zeolite or a SAPO, and an iron salt via solid-state mixing techniques. Impregnating a molecular sieve with a solution of an iron salt can be performed using such techniques as incipient wetness impregnation and wet impregnation. These solid-state techniques range from simple loose mixing and grinding through to high energy mixing methods, such as ball milling.

The molecular sieve, preferably a zeolite or a SAPO, can be pre-treated in an oxidizing atmosphere at a temperature in the range of about 500° C. to about 800° C. for a time period from about one hour to about three hours, prior to impregnating the molecular sieve, preferably a zeolite or a SAPO, with a solution of an iron salt and then receiving hydrothermal or thermal treatment.

The iron-containing molecular sieve is preferably small or medium pore. Preferred small or medium pore molecular sieves include zeolites and SAPOs. Preferred molecular sieves include BEA (beta-zeolite), MFI (LSM-5), FER (ferrierite), CHA (chabasite), AFX, AEI, SFW, SAPO-34, SAPO-56, SAPO-18 or SAV SAPO STA-7.

In another aspect, the invention also relates to a process of making a catalyst module for abating nitrogen oxides in a gas stream by selective catalytic reduction. A catalyst module is a device containing a catalyst within a housing where the housing comprises one or more inlets for the gas stream to enter the housing, and one or more outlets for the gas to exit after passing through the catalyst in the housing. The process of making the catalyst module comprises combining a molecular sieve, preferably a zeolite or a SAPO, with at least one ionic iron species and at least one organic compound to form a mixture, calcining the mixture and removing the at least one organic compound, forming a catalyst structure by extruding the calcined mixture into a substrate or coating the calcined mixture onto a substrate and mounting the catalyst structure within a housing having one or more inlets for gas to be treated with a reductant such as ammonia or urea in selective catalytic reduction. A catalyst module can also be made by a process comprising preparing a washcoat by forming a mixture comprising a molecular sieve, preferably a zeolite or a SAPO, at least one ionic iron species and at least one organic compound, applying the washcoat to a substrate, calcining the coated mixture and removing the at least one organic compound to form a catalytic structure, and mounting the catalytic structure within a housing having one or more inlets for gas to be treated with a reductant such as ammonia or urea in selective catalytic reduction.

In another aspect, the invention relates to a method of increasing $NO_x$ conversion in an exhaust gas by contacting an exhaust gas containing $NO_x$ with an iron-containing molecular sieve that had been treated at a temperature from about 600° C. to about 900° C. for a period of time from about 5 minutes to about two hours, in a non-oxidizing atmosphere and in the presence of steam (hydrothermal treatment) or in a reducing atmosphere without the presence of steam (thermal treatment). The method can increase $NO_x$ conversion over the temperature range of 175-300° C. that is at least twice the conversion obtained using a comparable catalyst that had not undergone hydrothermal or thermal treatment but had been calcined at 500° C. for two hours. The method can also increase $NO_x$ conversion over the temperature range of 175-250° C. that is at least about three times the conversion obtained using a comparable catalyst that had not undergone hydrothermal or thermal treatment but had been calcined at 500° C. for two hours. The method can also increase $NO_x$ conversion over the temperature range of 250-300° C. that is at least about two times, preferably at least about three times the conversion obtained using a comparable catalyst that had not undergone hydrothermal or thermal treatment but had been calcined at 500° C. for two hours. The method can also increase $NO_x$ conversion over the temperature range of 200-250° C. that is at least about two times, preferably at least about three times the conversion obtained using a comparable catalyst that had not undergone hydrothermal or thermal treatment but had been calcined at 500° C. for two hours.

The invention also relates to a method of increasing $NO_x$ conversion in an exhaust gas by contacting an exhaust gas containing $NO_x$ with an iron-containing molecular sieve that had been treated at a temperature from about 600° C. to about 900° C. for a period of time from about 5 minutes to about two hours, in a non-oxidizing atmosphere and in the presence of steam (hydrothermal treatment) or in a reducing atmosphere without the presence of steam (thermal treatment), where the temperatures needed for 10, 50 and 90% NOx conversion in catalysts subjected to hydrothermal treatment are about 170, 240 and 280° C., which is at least 40° C. lower than the temperature needed to the same conversion using a comparable catalyst that had not undergone hydrothermal or thermal treatment (about 220, 300 and 350° C.). The method also provides for maximum $NO_x$ conversion at about 310° C., which is at least 60° C. lower than the temperature needed to maximum conversion in a comparable catalyst that had not undergone hydrothermal or thermal treatment (about 375° C.).

SCR-active iron-containing molecular sieves, preferably a zeolite or a SAPO, that had been treated at a temperature from about 600° C. to about 900° C. for a period of time from about 5 minutes to about two hours, in a non-oxidizing atmosphere and in the presence of steam (hydrothermal treatment) or in a reducing atmosphere without the presence of steam (thermal treatment), can increase $NO_x$ conversion over the temperature range of 175-300° C. that is at least twice the conversion obtained using a comparable catalyst that had not undergone hydrothermal or thermal treatment but had been calcined at 500° C. for two hours. The SCR-active iron-containing molecular sieves, preferably a zeolite or a SAPO, that had received hydrothermal treatment or thermal treatment, can also increase $NO_x$ conversion over the temperature range of 175-250° C. that is at least about three times the conversion obtained using a comparable catalyst that had not undergone hydrothermal or thermal treatment but had been calcined at 500° C. for two hours. The SCR-active iron-containing molecular sieves, preferably a zeolite or a SAPO, that had received hydrothermal treatment or thermal treatment, can also increase $NO_x$ conversion over the temperature range of 250-300° C. that is at least about two times, preferably at least about three times the conversion obtained using a comparable catalyst that had not undergone hydrothermal or thermal treatment but had been calcined at 500° C. for two hours. The SCR-active iron-containing molecular sieves, preferably a zeolite or a SAPO, that had received hydrothermal treatment or thermal treatment, can also increase $NO_x$ conversion over the temperature range of 200-250° C. that is at least about two times, preferably at least about three times the conversion obtained using a comparable catalyst that had not undergone hydrothermal or thermal treatment but had been calcined at 500° C. for two hours.

The SCR-active iron-containing molecular sieves, preferably a zeolite or a SAPO, that had received hydrothermal treatment or thermal treatment, can convert about 10, 50 and 90% NOx at about 170, 240 and 280° C. The temperatures needed for these conversions are at least 40° C. lower than the temperature needed for the same conversion using a comparable catalyst that had not undergone hydrothermal or thermal treatment (about 220, 300 and 350° C.). The SCR-active iron-containing molecular sieves, preferably a zeolite or a SAPO, that had received hydrothermal treatment or thermal treatment, also provide maximum $NO_x$ conversion at about 310° C., which is at least 60° C. lower than the temperature needed to maximum conversion in a comparable catalyst that had not undergone hydrothermal or thermal treatment (about 375° C.).

SCR-active iron-containing molecular sieves, preferably a zeolite or a SAPO, according to the invention, can exhibit a selective catalytic reduction of $NO_x$ with $NH_3$ or urea at 200° C. with an ammonia fill between about 0.2 and 0.6 $_L$a that is at least 10%, preferably at least 15% and more preferably at least 20%, greater than a comparable iron-containing molecular sieve that was not hydrotherinally or thermally treated but was calcined at 750° C. fbr five hours, Preferably, the above increases in NOx conversion occur with ammonia fills between about 0.2 and 1.0 g/L.

The SCR-active iron-containing molecular sieve, preferably a zeolite or a SAPO, according to the invention, preferably has the iron present in the iron-containing molecular sieve having a higher ratio of $Fe^{2+}$ to $Fe^{3+}$ than if the iron-containing molecular sieve were calcined at about 500° C. for about two hours without performing the hydrothermal or thermal treatment. Preferably, the iron-containing zeolite or SAPO having the higher ratio of $Fe^{2+}$ to $Fe^{3+}$ is a ferrierite, a ZSM-5 or SAPO-34, The iron-containing molecular sieve, preferably a zeolite or a SAPO, can also only contain $Fe^{3+}$, as evidenced by Mossbauer spectroscopy.

An SCR-active iron-containing ferrierite has a Mossbauer spectrum comprising three doublets having isomer shifts (CS) and quadrupole splitting (QS) of: (a) CS=0.35 mm/s and QS=1.09 mm/s; (b) CS=0.44 mm/s and QS=2.18 mm/s, and (c) CS=1.2 mm/s and QS=2.05 mm/s, where the values for CS and QS are ±0.02 mm/s.

BRIEF DESCRIPTION OF THE DRAWINGS

Other objects, features and advantages of the invention will become more apparent after reading the following detailed description of examples of the invention, given with reference to the accompanying drawings.

EXAMPLE 1

3 wt % iron was added to a commercially available ferrierite zeolite by spray drying the ferrierite zeolite with ammonium Fe (III) oxalate in solution so as to give the desired Fe loading. One portion of the resulting iron-containing ferrierite was dried at 105° C. overnight and was activated under a flow of 10% steam in nitrogen at 800° C. for 1 hour. This material was not subjected to calcination. Another portion of the iron-containing ferrierite was calcined at 500° C. in air for 2 hours to use as reference.

In the examples that follow, powder samples of the catalysts were obtained by pelletizing the original samples, crushing the pellets and then passing the powder obtained through a 255 and 350 micron sieves to obtain a powder having particle size between 255 and 350 microns. The powder samples were loaded into a Synthetic Catalyst Activity Test (SCAT) reactor and tested using the following synthetic diesel exhaust gas mixture (at inlet) including nitrogenous reductant: 500 ppm NO, 550 ppm $NH_3$, 12% $O_2$, 4.5% $H_2O$, 4.5% $CO_2$, 200 ppm CO, balance $N_2$ at a space velocity of 330 liters per gram of powder catalyst per hour. The samples were heated ramp-wise from 150 to 550° C. at 5° C./min and the composition of the off-gases deteeted and the activity of the samples to promote NOx reduction was thereby derived.

Figure 1:
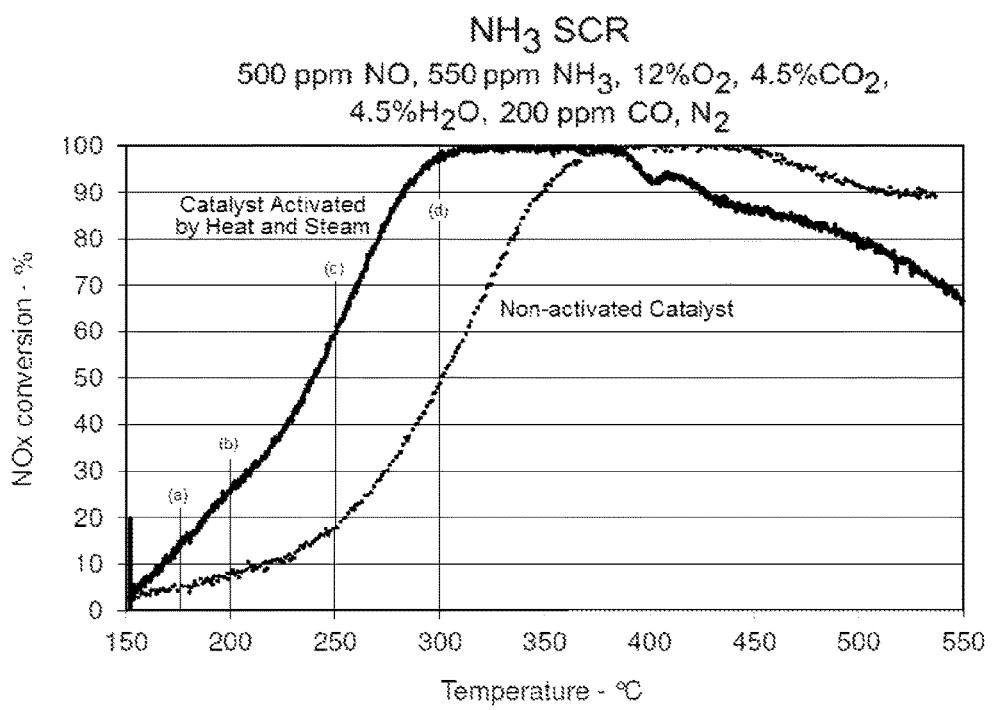
FIG. 1 is a graph illustrating the $NO_x$ conversion using an SCR-active, iron-containing zeolite that had been prepared using a hydrothermal treatment according to the invention, in comparison to a conventionally-prepared iron-containing zeolite that did not receive a hydrothermal treatment, but was calcined at about 500° C. for about 2 hours.

As shown in FIG. 1, iron ferrierite in the form of a powder catalyst that was subjected to the hydrothermal treatment under a flow of 10% steam in nitrogen at 800° C. for 1 hour, displays markedly superior low temperature (from about 175-300° C.) conversion of $NO_x$, as compared to the iron ferrierite that was not so treated, and instead was subjected to conventional calcination at 500° C. in air for 2 hours. The catalyst subjected to the hydrothermal treatment produced about three times the conversion of NOx from compared to the conventionally treated catalyst from about 175° C. to about 250° C., (see lines (a)-(c) which show the amounts of NOx conversion at 175, 200 and 250° C., respectively). The amount of conversion using the catalyst subjected to hydrothermal treatment at 175, 200 and 250° C. was about 15, 25 and 60%, respectively, while the amount of conversion using the conventionally treated catalyst was about 5, 8 and 18%, respectively. At 300° C., the amount of conversion using the catalyst subjected to hydrothermal treatment was about twice that from the conventionally treated catalyst (>95% versus 50%)

FIG. 1 also shows that catalysts subjected to hydrothermal treatment could convert comparable amounts of NOx at significantly lower temperatures than conventionally treated catalyst. Temperatures needed for 10, 50 and 90% NOx conversion in catalysts subjected to hydrothermal treatment were about 170, 240 and 280° C. but were about 220, 300 and 350° C. for conventionally treated catalyst. The lowest temperature for maximum NOx conversion was about 310° C. for catalyst subjected to hydrothermal treatment but was about 375° C. for conventionally treated catalyst.

These results demonstrate that catalyst subjected to hydrothermal treatment can produce significantly higher NOx conversion compared to a comparable conventionally treated catalyst. Catalysts subjected to hydrothermal treatment convert similar amounts of NOx at much lower temperatures compared to a comparable conventionally treated catalyst.

Figure 2:
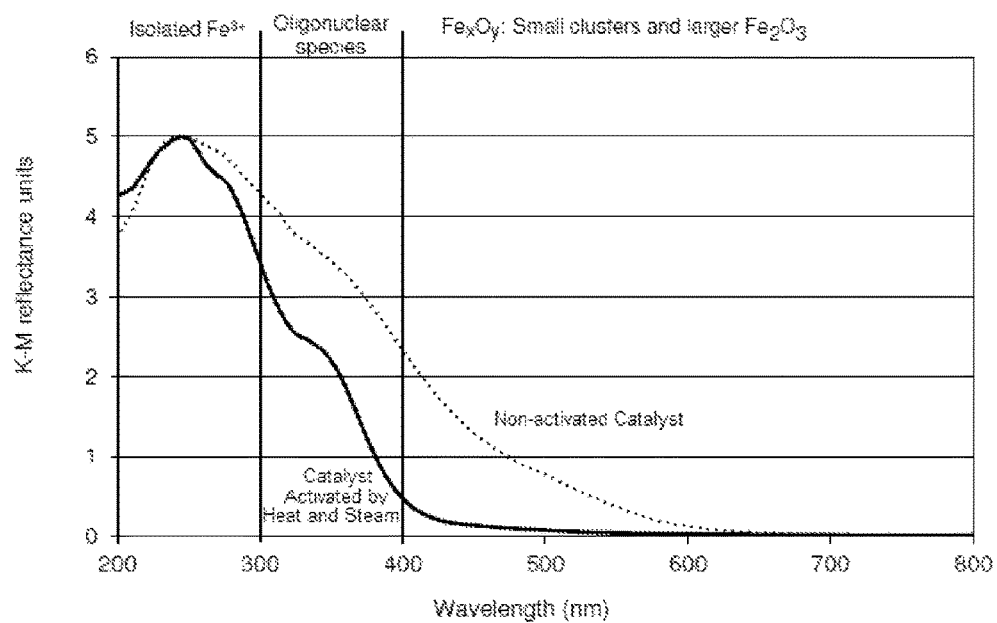
FIG. 2 is a plot obtained by applying diffuse-reflectance UV-Vis spectroscopy to powder samples of the iron-containing zeolites represented in FIG. 1.

The same powder samples were analyzed using diffuse-reflectance UV-Vis spectroscopy in a Perkin-Elmer Lambda 650S spectrometer equipped with an integrating sphere using BaSO4 as a reference. The samples were placed and packed in a holder. The scan interval was set to 1 nm from 190 to 850 nm, the response time was 0.48 sec and a 10% beam attenuator was used in the reference beam. The data was converted to Kubelka-Munk and normalised to 5 to the maximum ordinate. The resulting plots are shown in FIG. 2, in which the curves are normalized to the maximum ordinate. These plots indicate that the activation of the iron ferrierite catalyst in steam and $N_2$, leads to significant redispersion of larger Fe species into more active Fe sites, as is shown by the reduction in reflectance from 300-400 nm, where oligonuclear species are measured and in the region above 400 nm, where small clusters of iron oxide and larger $Fe_2O_3$ species are measured.

Figure 3A:
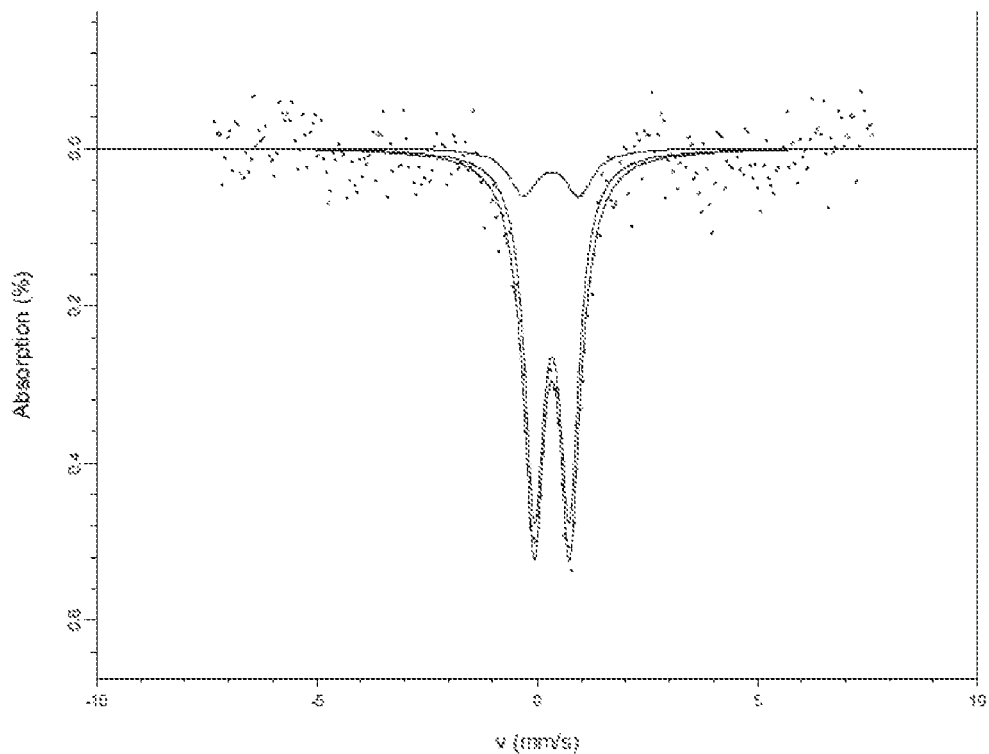
FIGS. 3a and 3b are plots obtained by performing Mössbauer spectroscopy to powder samples of the iron-containing zeolites represented in FIG. 1.
Figure 3B:
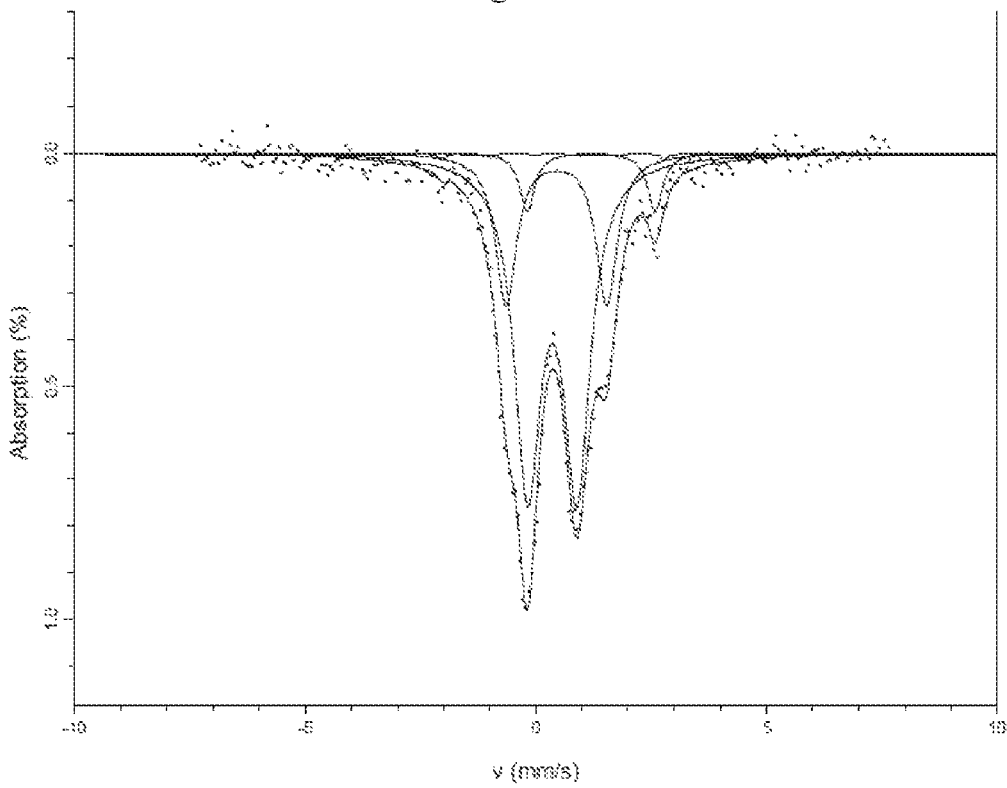

Powder samples were also analyzed using Mössbauer spectroscopy. $^{57}Fe$ Mössbauer spectroscopy was performed at room temperature using a Wissel constant acceleration spectrometer in transmission mode using a 57Co source in a rhodium matrix. The spectrometer was calibrated relative to α-Fe. The samples were dried and placed in a holder that was glued closed. Mössbauer data were collected over a velocity range of +/−6 mm s$^{-1}$ and for different periods of time depending on the sample. A calibration run was performed on an α-Fe foil over the same velocity range. All isomer shift values were reported relative to α-Fe and spectra were analysed using the Lorentzian line-shapes facility of RECOIL software [Lagarec K and Rancourt D G, Recoil: Mössbauer spectral analysis software for Windows. http://www.isapps.ca/recoil/]. The resulting spectra is shown in FIGS. 3a and 3b. FIG. 3a is a spectrum of the conventionally calcined catalyst (without hydrothermal treatment). The spectrum has two doublets, both having parameters indicative of Fe(III) in an octahedral environment as shown by an isomer shift (CS)=0.35 mm/s and quadrupole splitting (QS)=0.65 mm/s and CS=0.34 mm/s and QS=0.99 mm/s, respectively. The spectra has two doublets of approximately equal intensity centered at about −0.05 and about 0.69 mm s$^{-1}$. FIG. 3b is a spectrum of the hydrothermally activated catalyst. This spectrum displays an additional doublet (CS=1.2 mm/s and QS=2.8 mm/s) not found in the spectrum from the sample produced without hydrothermal treatment (FIG. 3a). The parameters of the additional doublet are indicative of Fe(II) in a possibly octahedral environment as indicated by the values CS=1.2 mm/s and QS=2.8 mm/s. Typical values for isomer shifts for Fe(II) are between 0.7 and 1.4 mm/s and for Fe(III) are between 0.1 and 0.6 mm/s, (Edyta Tabor, Karel Zaveta, Naveen K. Sathu, Zdenka Tvaruzkova, Zdenek Sobalík; Catalysis Today 169 (2011) 16-23) One of ordinary skill in the art would recognize that both the location of the peaks and the intensity of the peaks can vary depending on numerous factors, including, but not limited to, the age of the source, the length of time of data acquisition, the presence of water in the sample, Fe loadings, as well as the type of molecular sieve used.

The spectrum of the iron ferrierite activated according to the invention shows that some $Fe^{3+}$ species that are present in the conventionally calcined iron ferrierite convert to $Fe^{2+}$ during activation at high temperature in $H_2O/N_2$.

EXAMPLE 2

An iron ferrierite was made as described above by combining 3 wt % iron with a commercially available ferrierite zeolite by spray drying the ferrierite zeolite with ammonium Fe (II) sulphate in solution so as to give the desired Fe loading. A series of powder samples were then prepared by treating the iron ferrierite at the temperatures and atmospheric conditions as shown in Table 1. Samples were prepared for determining their catalytic activity by coating the powder onto ceramic cores.

TABLE 1

Conditions for Preparing Modified Iron Zeolite

| Temperature (° C.) | Time | Atmosphere | Treatment |
|---|---|---|---|
| 800 | 1 h | 2% $H_2$ + $N_2$ | Thermal |
| 800 | 1 h | 10% $H_2O$ + $N_2$ | Hydrothermal |
| 850 | 1 h | 10% $H_2O$ + $N_2$ | Hydrothermal |
| 850 | 2 h | 10% $H_2O$ + $N_2$ | Hydrothermal |
| 750 | 5 h | Air | Calcination (Reference) |

The reference sample was prepared by calcination at 750° C. because the ferrierite zeolite was treated with ammonium Fe (II) sulphate and a higher temperature was needed to remove the sulfate.

Figure 4:
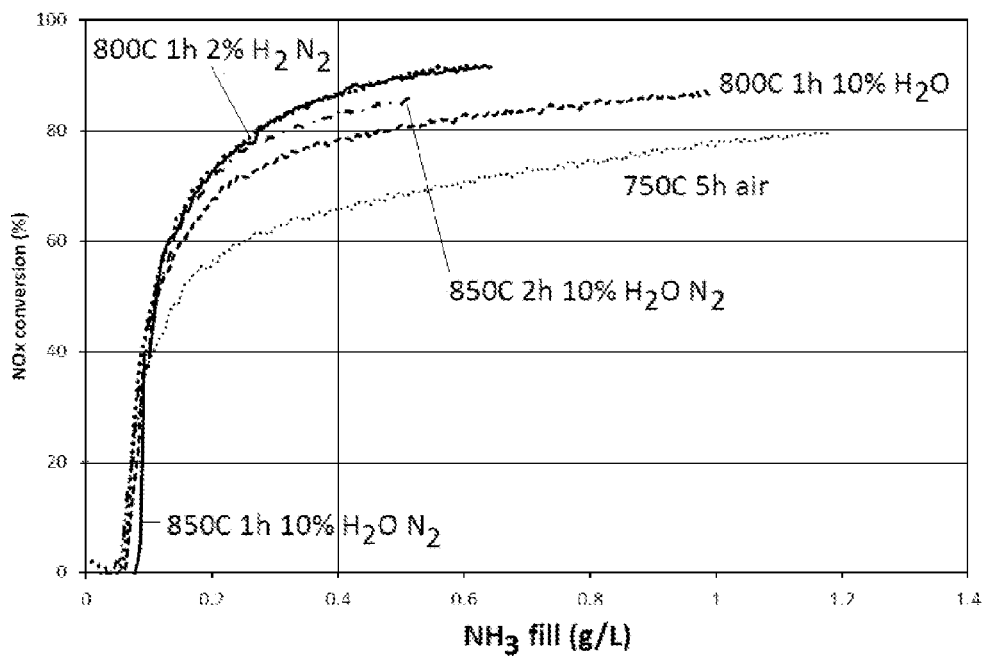
FIG. 4 is a graph comparing the NOx conversion as a function of $NH_3$ fill, for each of a series of iron-containing zeolite samples prepared under respectively different processing conditions.

The test conditions for the data shown in FIG. 4 were $NO_x$ conversion at 200° C. as a function of $NH_3$ fill, with 75% $NO_2/NOx$, space velocity 60 k/hr, and alpha ratio 1.5. These test conditions differ from those used to produce the data shown in FIG. 1 at least because of a difference in the composition of the gas. The gas used to generate the data in FIG. 1 contained NO as the only NOx compound, whereas the gas used to generate the data in FIG. 4 contained a mixture of NO and $NO_2$, where $NO_2$ accounted for about 75% of the total NOx. One of ordinary skill in the art would recognize that the rates of conversion using only NO and not $NO_2$ are slower than the rates of conversion using both NO and $NO_2$, and therefore rates of conversion measured using only NO are worst-case conversion rates.

As shown in FIG. 4, a substantial (10-20%) increase in NOx conversion was observed with ammonia fill between about 0.2 and 0.6 g/L. The three catalysts produced using hydrothermal treatment in a mixed atmosphere comprising steam and nitrogen produced the highest differences compared to the catalyst that did not undergo hydrothermal treatment. NOx conversion using catalysts that underwent hydrothermal treatment at temperatures of about 800 to about 850° C. in a mixed atmosphere of steam and nitrogen for about one hour was about 15 to 20% greater than from a comparable catalyst that did not receive a hydrothermal treatment and had only been treated in air (calcined). The catalyst producing in the reducing atmosphere (2% $H_2$ in $N_2$), without steam treatment, produced conversions comparable to the sample that received hydrothermal treatment at 850° C. for 1 hour.

Figure 5:
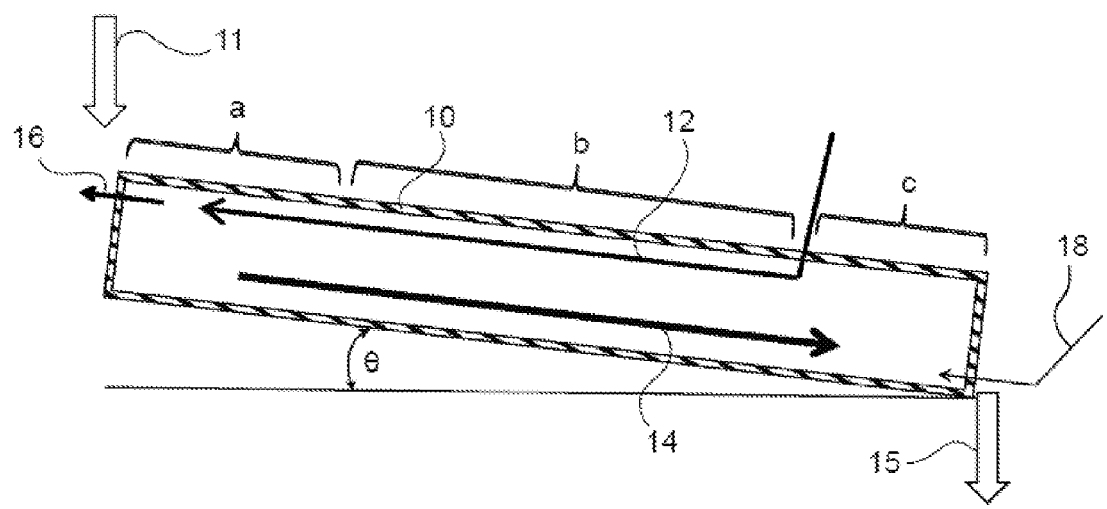
FIG. 5 schematically depicts an example of a rotary calcining oven that can be used to perform the hydrothermal treatment or thermal treatment followed by exposure to oxygen.

FIG. 5 schematically depicts an example of a rotary calcination oven 10 that is well-suited to perform the hydrothermal treatment according to the invention. The oven 10 is generally cylindrical, and mounted for rotation about its axis. The oven 10 is inclined at an angle θ of about 1 to about 15°. An iron-containing molecular sieve, preferably a zeolite or a SAPO, in powder form is introduced at the higher end of oven 10, as indicated by arrow 11. As the oven is rotated, the iron-containing molecular sieve moves downwardly through the rotating oven in the direction of arrow 14. A countercurrent flow of the non-oxidizing atmosphere is provided, as indicated by the arrow 12 in FIG. 5. The activated iron containing molecular sieve is then removed from the oven 10, as indicated by the arrow 15. Steam is added with the countercurrent non-oxidative or reductive gas when a hydrothermal treatment is performed.

The heating of the calcination oven is preferably controlled such that three heating zones a, b and c are maintained. In zone a, the temperature increases from 25° C. at the oven inlet to the temperature at which the hydrothermal or thermal treatment is performed. In zone b, the temperature is maintained at the temperature at which the hydrothermal or thermal treatment is performed. In zone c, the temperature decreases from the temperature at which the hydrothermal or thermal treatment is performed, to about 25° C. at the oven outlet.

If an atmosphere of for example nitrogen and steam, or nitrogen and hydrogen, is maintained exclusively within the oven, the activated iron containing zeolite has a grey-black color as it emerges from the oven outlet. Following coating on a substrate and ordinary calcination in air at about 500 to about 600° C., the color of the iron containing zeolite changes from grey-black to orange-beige.

It has been unexpectedly discovered that if the treatment in the oven 10 is modified so as to permit, a small amount of oxygen to enter the oven after the hydrothermal treatment, as shown by the arrow 18 in FIG. 5, the performance of the iron containing zeolite thus processed is further improved. The amount of oxygen admitted near the outlet of the oven 10 is in the range of about 1 ppm to about 200,000 ppm above the ambient level of oxygen in the oven.

When the treatment concludes with a controlled inclusion of oxygen within the oven above ambient levels, it was found that the iron containing zeolite exiting the oven can have a different color than the material before the treatment, and that the conversion efficiency of the iron containing zeolite is better than when oxygen was not introduced into the oven. This is the case even after the iron-containing zeolites processed in the oxygen-free oven undergo a subsequent calcination, as described above.

It will be understood that the foregoing description and specific examples shown herein are merely illustrative of the invention and the principles thereof, and that modifications and additions may be easily made by those skilled in the art without departing from the spirit and scope of the invention, which is therefore understood to be limited only by the scope of the appended claims.

What is claimed is:

1. A method of making an SCR-active molecular sieve-based catalyst, the method comprising performing a hydrothermal treatment on an iron-containing molecular sieve in a non-oxidizing atmosphere at a temperature in the range of 600-900° C. for a time period from 5 minutes to two hours, where the molecular sieve is a zeolite having an AEI, AFX, CHA, FER, or SFW framework.

2. The method according to claim 1, wherein the hydrothermal treatment is performed at a temperature in the range of 650-850° C. for a time period from 15 minutes to two hours.

3. The method according to claim 1, wherein the zeolite is FER and the hydrothermal treatment is performed at a temperature in the range of about 700 to about 900° C. for a time period from 5 minutes to two hours.

4. The method according to claim 1, wherein the non-oxidizing atmosphere comprises nitrogen.

5. The method according to claim 1, wherein the non-oxidizing atmosphere is a reducing atmosphere.

6. The method according to claim 5, wherein the reducing atmosphere comprises hydrogen gas.

7. The method according to claim 1, wherein the iron-containing molecular sieve subjected to the hydrothermal treatment is in powder form.

8. The method according to claim 1, wherein the iron-containing molecular sieve subjected to the hydrothermal treatment is in the form of an extruded unsupported catalyst or a coating on a support body.

9. The method according to claim 1, wherein the iron-containing molecular sieve is prepared by contacting a molecular sieve with an iron salt.

10. A method of making an SCR-active molecular sieve catalyst, comprising performing a hydrothermal treatment on an iron-containing molecular sieve at a temperature in the range of 600-900° C. for a time period from 5 minutes to two hours, then introducing oxygen into the atmosphere during at least a portion of the time when the iron-containing molecular sieve cools from the hydrothermal or thermal treatment temperature to ambient temperature, where the molecular sieve is a zeolite having an AEI, AFX, CHA, FER, or SFW framework.

11. The method according to claim 10, wherein the hydrothermal treatment is performed using a means providing mixing, temperature and atmospheric control.

12. The method according to claim 10, wherein the hydrothermal treatment is performed in an inclined rotary calcination oven in which the iron-containing molecular sieve in powder form is exposed to a countercurrent flow of gas constituting a non-oxidizing or reducing atmosphere.

13. A method of making an SCR-active molecular catalyst, comprising performing a hydrothermal on an iron-containing molecular sieve in a non-oxidizing atmosphere at a temperature in the range of 600-900° C. for a time period from 5 minutes to two hours, then introducing oxygen into the non-oxidizing atmosphere during at least a portion of the time when the iron-containing molecular sieve cools from the hydrothermal treatment temperature to ambient temperature, where the molecular sieve is a zeolite having an AEI, AFX, CHA, FER, or SFW framework.

* * * * *